United States Patent
Han et al.

(10) Patent No.: US 10,599,845 B2
(45) Date of Patent: Mar. 24, 2020

(54) MALICIOUS CODE DEACTIVATING APPARATUS AND METHOD OF OPERATING THE SAME

(71) Applicant: NPCORE, INC., Seoul (KR)

(72) Inventors: Seung Chul Han, Seoul (KR); Su Hyun Lee, Seoul (KR); Dong Jin Shin, Seoul (KR)

(73) Assignee: NPCORE, INC., Seoul (KR)

( * ) Notice: Subject to any disclaimer, the term of this patent is extended or adjusted under 35 U.S.C. 154(b) by 0 days.

(21) Appl. No.: 15/819,269

(22) Filed: Nov. 21, 2017

(65) Prior Publication Data

US 2018/0165453 A1    Jun. 14, 2018

(30) Foreign Application Priority Data

Dec. 13, 2016 (KR) .................. 10-2016-0169401
Nov. 17, 2017 (KR) .................. 10-2017-0153985

(51) Int. Cl.
*G06F 21/56* (2013.01)

(52) U.S. Cl.
CPC ............ *G06F 21/566* (2013.01); *G06F 21/56* (2013.01); *G06F 2221/034* (2013.01)

(58) Field of Classification Search
CPC .................. G06F 21/566; G06F 2221/034
See application file for complete search history.

(56) References Cited

U.S. PATENT DOCUMENTS

| | | | | |
|---|---|---|---|---|
| 9,384,336 | B1* | 7/2016 | Ashley | G06F 21/30 |
| 9,407,648 | B1* | 8/2016 | Pavlyushchik | G06F 9/544 |
| 2011/0209219 | A1* | 8/2011 | Zeitlin | G06F 21/554 |
| | | | | 726/23 |
| 2015/0310211 | A1* | 10/2015 | Mei | G06F 21/56 |
| | | | | 726/23 |
| 2015/0332043 | A1* | 11/2015 | Russello | G06F 11/30 |
| | | | | 726/23 |
| 2016/0182550 | A1* | 6/2016 | Spurlock | H04L 63/1425 |
| | | | | 726/23 |
| 2016/0212159 | A1* | 7/2016 | Gupta | G06F 21/54 |
| 2016/0232347 | A1* | 8/2016 | Badishi | G06F 21/54 |
| 2017/0286673 | A1* | 10/2017 | Lukacs | G06F 21/554 |
| 2018/0024874 | A1* | 1/2018 | Al Sharnouby | G06F 9/546 |

\* cited by examiner

*Primary Examiner* — Joseph P Hirl
*Assistant Examiner* — Thomas A Gyorfi

(57) ABSTRACT

Disclosed are a malicious code deactivating apparatus and a method of operating the same. The malicious code deactivating apparatus and the method of operating the same provide a high security malicious code deactivating apparatus for preliminarily performing a malicious code inspection on a target process and then executing the target process in a terminal unit, by including a monitor, a comparator, a controller, an analyzer, and a storage.

8 Claims, 3 Drawing Sheets

MALICIOUS CODE DEACTIVATING APPARATUS AND METHOD OF OPERATING THE SAME

CLAIM FOR PRIORITY

This application claims priority to Korean Patent Application No. 2016-0169401 filed on Dec. 13, 2016 and No. 2017-0153985 filed on Nov. 17, 2017 in the Korean Intellectual Property Office (KIPO), the entire contents of which are hereby incorporated by reference.

BACKGROUND

1. Technical Field

Example embodiments of the present invention relate in general to the field of malicious code deactivating apparatus and methods of operating the same, and more particularly, to a malicious code deactivating apparatus capable of preliminarily performing a malicious code inspection of a new process on an external server, and a method of operating the same.

2. Related Art

Today, with developments in the manufacturing industry and information technology (a) industry, convergence of information and communication technologies (ICT) has accelerated, and network security has become increasingly important.

Meanwhile, there is a gradual increase in the number of cases of damage involving malicious code, such as 3.4 DDoS attacks, 3.20 cyber terrorism, Korea Hydro & Nuclear Power Co. Ltd., (KHNP) cases, and Interpark hacking accidents, which have happened recently.

Recently, with the proliferation of unknown or variant malicious code, such as the emergence of malicious code targeting zero-day vulnerability, the appearance of unknown bypass techniques for bypassing existing security equipment, and the generation of intelligent malicious code that is difficult to analyze and identify, there is an urgent need for a technology protecting against malicious code.

SUMMARY

Accordingly, embodiments of the present disclosure provide a malicious code deactivating apparatus and a method of operating the same for deactivating execution of malicious code.

Accordingly, embodiments of the present disclosure also provide a malicious code deactivating apparatus and a method of operating the same for performing a rapid malicious code inspection.

In some example embodiments, a malicious code deactivating apparatus in association with database in an external server for distinguishing malicious code may comprise a comparator and a controller. The comparator is configured to extract a target process that is to be subjected to a malicious code inspection, among at least one process executed by a terminal, and store at least one piece of information about the extracted target process in the database. The controller is configured to postpone execution of the extracted target process, receive a result of the completed malicious code inspection from the external server, and control execution of the postponed target process.

The target process may include at least one piece of new process that a newly created or downloaded process is not found when compared with a white list received from the external server.

The new process may be transmitted to the comparator by a filter driver using a call back function.

The malicious code deactivating apparatus may further include an analyzer configured to analyze the result of the malicious code inspection, wherein the analyzer may include: a first analyzer configured to transmit a first signal to the controller when the target process on which the malicious code inspection is completed is found on a black list; a second analyzer configured to transmit a second signal to the controller when the target process on which the malicious code inspection is completed is found on a white list; and a third analyzer configured to transmit a second signal to the controller when an inspection time is exceeded so that the malicious code inspection of the target process is not completed.

The controller may include: a first controller configured to postpone execution of the extracted target process; a second controller configured to block execution of the postponed target process according to the first signal; and a third controller configured to resume execution of the postponed target process according to the second signal.

The analyzer may further include a fourth analyzer configured to, in response to a completion request from user to complete the target process blocked by the first analyzer, transmit a second signal to the third controller.

Information about the target process may be stored in the white list of the external server in response to receiving a completion request to complete the processed target process.

The first controller may postpone execution of the extracted target process by suspending a thread handle corresponding to a process ID of the extracted target process.

The third controller may execute the postponed target process by resuming a thread handle corresponding to a process ID of the extracted target process.

In other example embodiments, a method of operating a malicious code deactivating apparatus in association with a database in an external server for distinguishing malicious code may include: extracting a target process for which malicious code is determined; postponing execution of the extracted target process; transmitting at least one piece of data attribute information of the postponed target process to an external server; analyzing a result of a malicious code determination inspection of the target process received from the external server; and controlling the postponed target process according to the result of the malicious code determination inspection of the target process.

The extracting of the target process may include: extracting new process that is a newly created or downloaded process; and comparing the new process with a white list received from the external server.

As is apparent from the above, the malicious code deactivating apparatus according the example embodiment of the present invention and the method of operating the same can provide a high security malicious code deactivating apparatus capable of protecting a terminal unit from malicious code by preliminarily inspecting a target process to be executed in the terminal unit in external server, and a method of operating the same.

The malicious code deactivating apparatus according the example embodiment of the present invention and the method of operating the same can provide a high performance malicious code deactivating apparatus having an increased processing speed by performing a malicious code inspection on an extension file that newly created or downloaded process using a monitor, and a method of operating the same.

The malicious code deactivating apparatus according the example embodiment of the present invention and the method of operating the same provide a high security malicious code deactivating apparatus, capable of protecting against unexpected malicious activity by having a monitor perform monitoring on a target process on which analysis is completed, and a method of operating the same.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
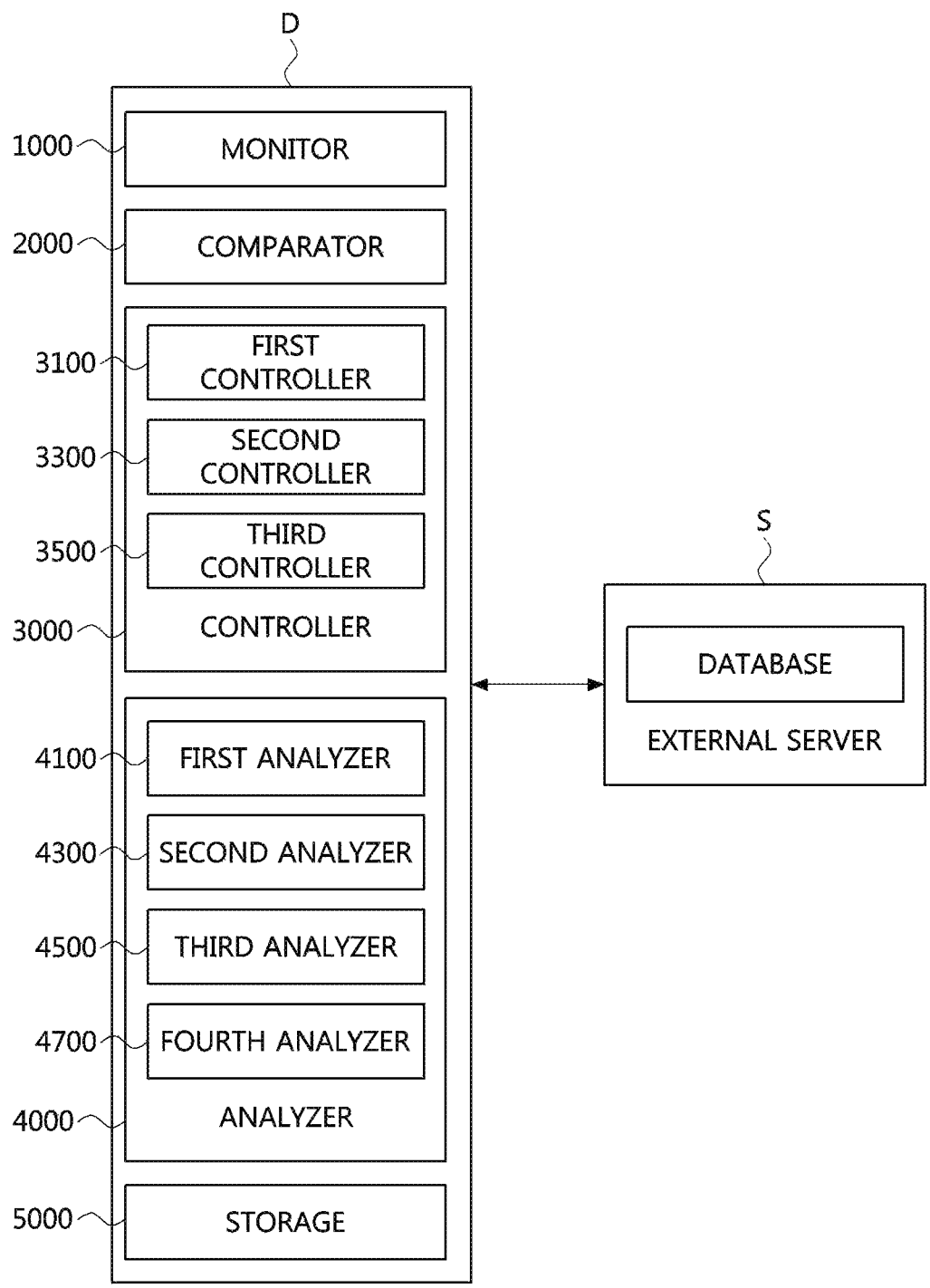
FIG. 1 is a block diagram for describing a malicious code deactivating apparatus according to an example embodiment of the present invention.

While the present invention is susceptible to various modifications and alternative embodiments, specific embodiments thereof are shown by way of example in the drawings and will be described. However, it should be understood that there is no intention to limit the invention to the particular embodiments disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described with reference to the accompanying drawings in detail.

FIG. 1 is a block diagram for describing a malicious code deactivating apparatus according to an embodiment of the present invention.

Referring to FIG. 1, a malicious code deactivating apparatus D may include at least one of a program executed in a terminal unit. Here, the terminal unit may be at least one of a tablet PC, a laptop computer, a terminal unit for digital broadcasting, a personal digital assistant (PDA), a portable multimedia player (PMP), and a navigation system.

The malicious code deactivating apparatus D may be executed in an environment in which an agent is installed. In general, an agent may refer to a program configured to perform a process according to a predetermined schedule without having additional user management. Accordingly, the malicious code deactivating apparatus D may dynamically control extraction and/or execution of a target process by components 1100 and 1500 to be described below. The features of the components will be described below in more detail.

The malicious code deactivating apparatus D may include a monitor 1000, a comparator 2000, a controller 3000, an analyzer 4000, and a storage 5000.

The monitor 1000 may extract a new process executed in a terminal unit. In more detail, the monitor 1000 may extract a new process by using a filter driver. For example, the monitor 1000 may be a minifilter driver.

In addition, the monitor 1000 may transmit the new process to the comparator 2000 to be described below, by using a callback function.

The comparator 2000 may extract a target process by comparing the new process with a white list. In this case, the new process may be received from the monitor 1000 as described above. In addition, the white list may be received from the storage 5000 which will be described below.

The white list may be a list of processes having safe IP addresses. Accordingly, the comparator 2000 may exclude a new process from an object to be inspected for malicious code when the new process corresponds to the white list. In other words, execution of the new process in the terminal unit may proceed.

Meanwhile, the comparator 2000 may extract a new process as a target process when the new process does not correspond to the white list. Then, the comparator 2000 may transmit a first signal to a first controller 3100 to be described below. Accordingly, an execution of the new process in the terminal unit may be postponed. A method of postponing the target process will be described in more detail when describing the first controller 3100 below.

In addition, when the new process is a target process that does not correspond to the white list, the comparator 2000 may store information about the target process in a database (DB) of an external server S. In this case, the information may include at least one of a file path, the presence of a sign check, a process ID, state information, and an inspection time.

The sign check may be a certificate assigned to a security authenticated application program, and the state information may be information providing a real-time state of a target process, represented as a Done state, an Analyzing state, and a Block state. According to an example embodiment, the target process may be stored in the DB in the analyzing state.

Then, the external server S may analyze whether the target process stored in the DB corresponds to malicious code.

The controller 3000 may control execution of the target process. The controller 3000 may include a first controller 3100, a second controller 3300, and a third controller 3500.

As described above, the first controller 3100 may postpone an execution of the target process by using a thread. The thread may be an execution code performing a main task of a process.

According to an example embodiment, in more detail, the first controller 3100 may extract a thread corresponding to a process ID of a target process. Then, the first controller 3100 may change all handles of the extracted thread into the suspended state through a SuspendThread function. Therefore execution of the target process in the terminal unit may be postponed. For example, the thread may be extracted by using a CreateToolhelp32Snapshot API function.

The second controller 3300 may block execution of the target process postponed by the first controller 3100. In this case, the second controller 3300 may operate upon receiving a first signal from the analyzer 4000 to be described below.

The third controller 3500 may resume execution of the target process postponed by the first controller 3100. In this case, the third controller 3500 may operate upon receiving a second signal from the analyzer 4000 to be described below.

According to an example embodiment, in more detail, the first controller 3100 may extract a thread corresponding to a process ID of a target process. Then, the third controller 3500 may change all of handles of the thread into the resume state by using a ResumeThread function. Accordingly, execution of the target process postponed by the first controller 3100 may be resumed. For example, the thread may be extracted by using a CreateToolhelp32Snapshot API as described above.

According to an example embodiment, a control result of the target process controlled by the controller 3000 may be provided to a user in the form of a notification message.

The analyzer 4000 may receive a result of a malicious code inspection of the target process from the DB.

Then, the analyzer 4000 may transmit a control signal to the second controller 3300 or the third controller 3500 according to the received result of the malicious code inspection as described above.

The analyzer 4000 may include a first analyzer 4100, a second analyzer 4300, a third analyzer 4500, and a fourth analyzer 4700.

The first analyzer 4100 may check whether the result of the malicious code inspection corresponds to a black list. When the result of the malicious code inspection corresponds to the black list, the first analyzer 4100 may change the state information of the target process in the DB into a finished state (Block). Then, the first analyzer 4100 may transmit a first signal to the second controller 3300.

The second analyzer 4300 may check whether the result of the malicious code inspection corresponds to a white list. When the result of the malicious code inspection corresponds to the white list, the second analyzer 4300 may change the state information of the target process in the DB into a finished state (Done). Thereafter, the second analyzer 4300 may transmit a second signal to the third controller 3500.

The third analyzer 4500 may check whether the result of the malicious code inspection exceeds an analysis time. According to an example embodiment, the third analyzer 4500 may determine that the analysis time has been exceeded when a result of the malicious code inspection is not transmitted from the DB within the analysis time.

When the result of the malicious code inspection has exceeded the analysis time, the third analyzer 4500 may change the state information of the target process in the DB into a finished state (Done). Then, the third analyzer 4500 may transmit a second signal to the third controller 3500.

The fourth analyzer 4700 may analyze the presence of a user's completion request to complete the target process that was blocked by the first analyzer 4100.

In more detail, as described above, the second controller 3300 may provide a user with a control state of the target process that was blocked by the first analyzer 4100.

In response to receiving a completion request to complete the target process from the user, the fourth analyzer 4700 may transmit a second signal to the third controller 3500. Accordingly, execution of the blocked target process may be resumed.

In addition, the fourth analyzer 4700 may change the state information (Block) of the target process in the DB into a finished state (Done).

The target process, the state of which is changed, may be stored in the white list in the external server S. In other words, the white list in the external server S may be updated. Then, the storage 5000 to be described below may download the updated white list.

The storage 5000 may store the white list downloaded from the external server S as described above.

According to an example embodiment, the storage 5000 may newly download the white list from the external server S when an update of the white list in the external server S is performed by the fourth analyzer 4700. Accordingly, the storage 5000 may reserve a new white list having updated information.

With the malicious code deactivating apparatus according to the example embodiment of the present invention, when a target process is extracted by the comparator, the target process is extracted on the basis of the updated white list, thereby providing a high efficiency and high performance malicious code deactivating apparatus having a processing speed that improves with each use.

The malicious code deactivating apparatus according to the example embodiment of the present invention has been described above. Hereinafter, a method of operating a malicious deactivating apparatus of an example embodiment of the present invention will be described.

Figure 2:
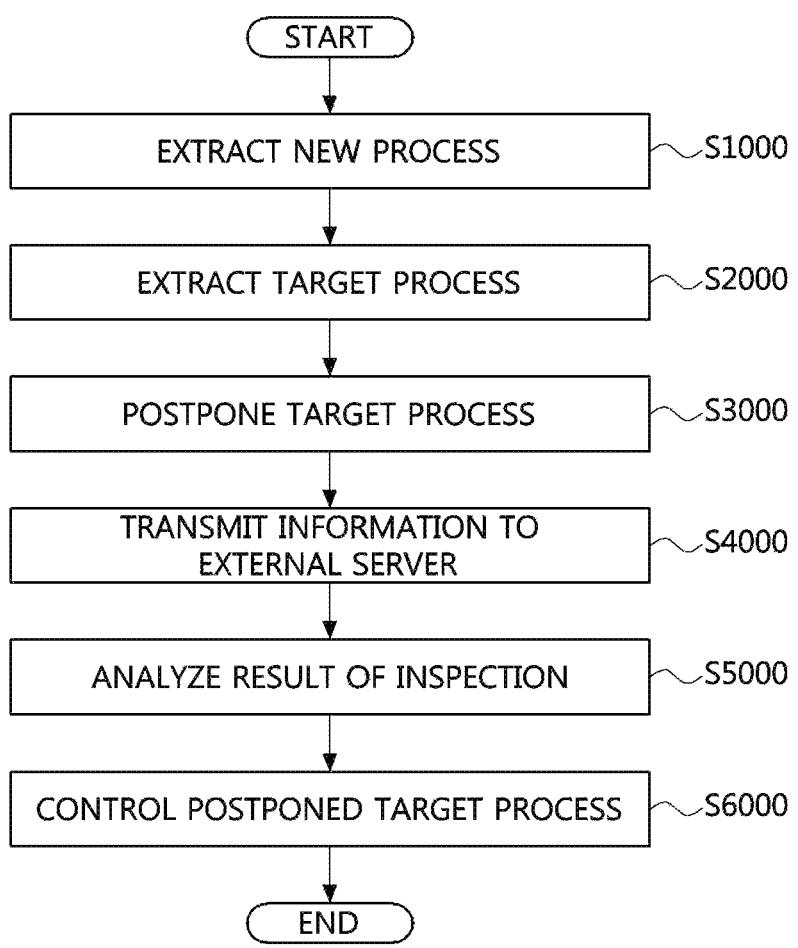
FIG. 2 is a flowchart for describing a method of operating a malicious code deactivating apparatus according to an example embodiment of the present invention.

FIG. 2 is a flowchart for describing a method of operating a malicious code deactivating apparatus according to an example embodiment of the present invention.

Referring to FIGS. 1 and 2, a malicious code deactivating apparatus may be executed. The executed malicious code deactivating apparatus may extract a new process (S1000).

Then, a target process may be extracted from the extracted new process (S2000). The target process may be a new process that does not correspond to the white list.

When the extraction of the target process is completed, execution of the target process may be postponed (S3000).

Then, the agent may transmit data attribute information of the target process to the DB (S4000). Accordingly, whether the target process is malicious code is inspected from the DB.

After the malicious code inspection of the target process from the DB is completed, a result of the inspection from the process is received and analyzed (S5000).

The analyzing of the result of the inspection will be described below with reference to FIG. 3 in more detail.

Figure 3:
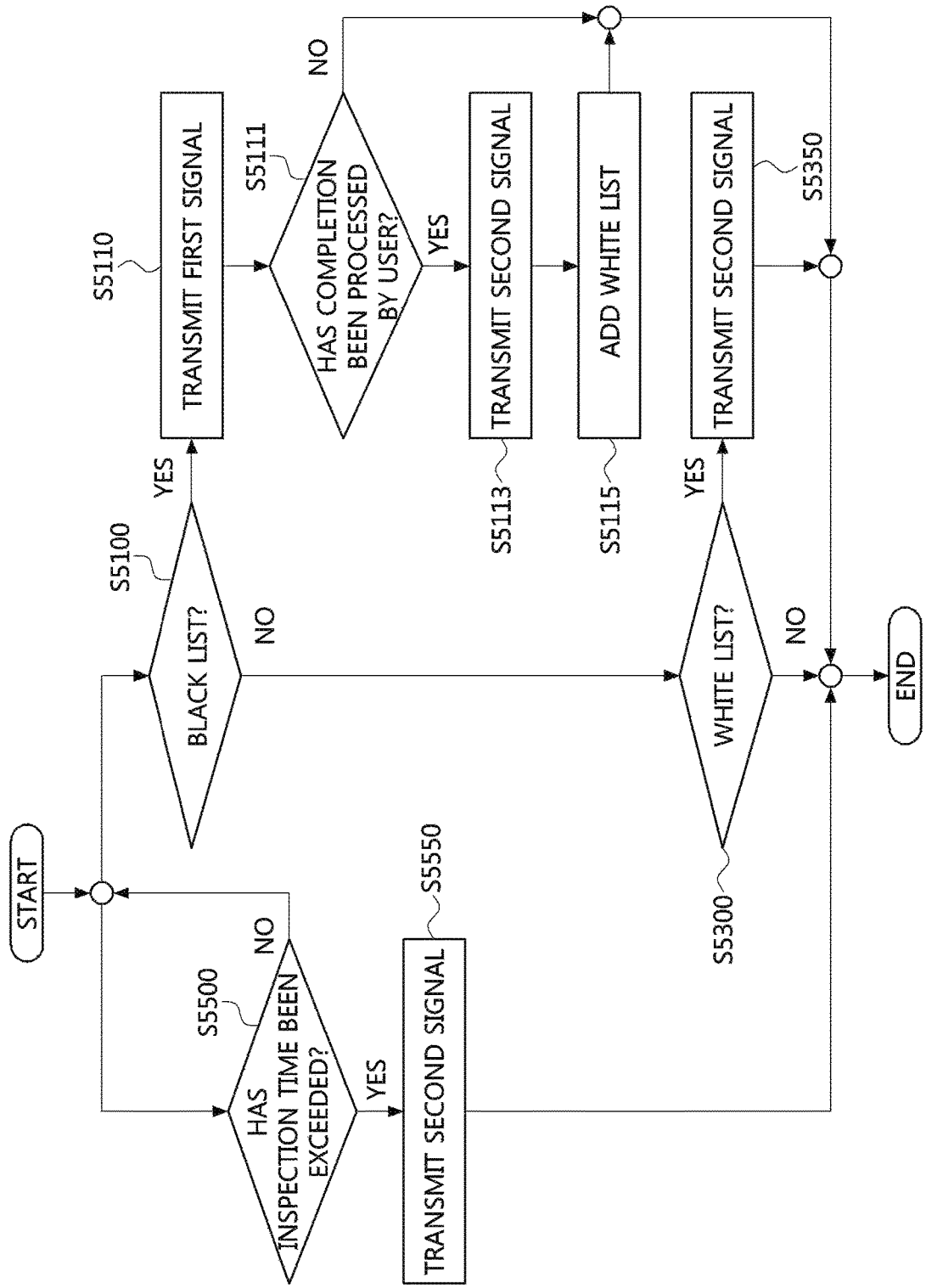
FIG. 3 is a flowchart for describing a method of operating a malicious code deactivating apparatus according to an example embodiment of the present invention.

FIG. 3 is a flowchart for describing an operation of analyzing a result of an inspection in a method of operating a malicious code deactivating apparatus according to an example embodiment of the present invention.

Referring to FIGS. 1 to 3, a result of the inspection is received from the DB (S5000).

Whether the result of the inspection corresponds to the black list may be determined by the first analyzer 4100 (S5100).

When the result of the inspection corresponds to the black list, the state information of the target process may be changed from the Analyzing state into the Block state. In addition, the first analyzer 4100 may transmit a first signal to the first controller 3100 (S5110).

Then, for the blocked target process, when a completion request to complete the target process is received from a user (S5111), the state information of the target process is changed from the Block state into the Done state. Then, a second signal is transmitted to the third controller 3500 from fourth analyzer 4700 (S5113).

In addition, information about the target process for which the completion request is received from the user may be added to the white list (S5115).

Meanwhile, when the result of the inspection does not correspond to the black list, whether the result of the inspection corresponds to the white list is determined by the second analyzer 4300 (S5300).

In this case, when the result of the inspection corresponds to the white list, the state information of the target process is changed from the Analyzing state into the Done state. In addition, the second analyzer 4300 may transmit a second signal to the third controller 3500 (S5350).

When there is no result of the inspection received from the DB within an inspection time (S5500), the third analyzer 4500 may change the state information of the target process from the Analyzing state into the Done state. Accordingly, the third analyzer 4500 may transmit a second signal to the third controller 3500 (S5550).

Referring again to FIG. 2, according to a signal transmitted after the analysis is performed, execution of the postponed target process may be processed (S6000). In more detail, the second controller 3300 having received a first signal from the analyzer 4000 may block execution of a process postponed in the terminal unit.

Meanwhile, reception of the postponed target process may be resumed by the third controller 3500 having received a second signal from the analyzer 4000. Accordingly, execution of the target process postponed in the terminal unit may be resumed.

The malicious code deactivating apparatus according to the example embodiment of the present invention and the method of operating the same have been described above. The malicious code deactivating apparatus and the method of operating the same include a monitor, a comparator, a controller, an analyzer, and a storage, thereby providing a high-security malicious code deactivating apparatus capable of executing a target process in a terminal after inspecting the presence of malicious code of the target process.

Although a few example embodiments of the present invention have been shown and described, the above example embodiments are for illustrative purposes only, and it should be appreciated by those skilled in the art that changes and modifications are possible without departing from the scope and sprit of the disclosure.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A malicious code deactivating apparatus in association with database in an external server for distinguishing malicious code, the malicious code deactivating apparatus comprising:

a comparator configured to extract a target process that is to be subjected to a malicious code inspection, among at least one process executed by a terminal, and store at least one piece of information about the extracted target process in the database;

a controller configured to postpone execution of the extracted target process, receive a result of the completed malicious code inspection from the external server, and control execution of the postponed target process;

an analyzer configured to analyze the result of the malicious code inspection; and a storage configured to store a first white list downloaded from the external server, wherein the target process includes a process extracted from a newly created or downloaded process that is not found in the first white list, wherein the result of a malicious code inspection is derived by executing the extracted target process in the external server so as to determine whether the extracted target process is infected with a malicious code or not before executing the terminal, wherein the analyzer comprises:

a first analyzer configured to transmit a first signal to the controller when the target process on which the malicious code inspection is completed is found in a black list of the external server;

a second analyzer configured to transmit a second signal to the controller when the target process on which the malicious code inspection is completed is found in a second white list which is included in the external server; and a third analyzer configured to transmit a second signal to the controller when an inspection time is exceeded to that the malicious code inspection of the target process is not completed, wherein the second white list, which is created by the external server includes at least one extra process that is determined as not infected with a malicious code among the target processes not belong to the first white list.

2. The malicious code deactivating apparatus of claim 1, wherein the new process is transmitted to the comparator by a filter driver using a call back function.

3. The malicious code deactivating apparatus of claim 1, wherein the controller comprises:

a first controller configured to postpone execution of the extracted target process;

a second controller configured to block execution of the postponed target process according to the first signal; and a third controller configured to resume execution of the postponed target process according to the second signal.

4. The malicious code deactivating apparatus of claim 3, wherein the analyzer further comprises a fourth analyzer configured to, in response to a completion request to complete the target process blocked by the first analyzer, transmit the second signal to the third controller.

5. The malicious code deactivating apparatus of claim 4, wherein fourth analyzer stores information of the target process in the second white list of the external server, responding to the request to complete the processed target process.

6. The malicious code deactivating apparatus of claim 3, wherein the first controller postpones execution of the extracted target process by suspending a thread handle corresponding to a process ID of the extracted target process.

7. The malicious code deactivating apparatus of claim 3, wherein the third controller executes the postponed target process by resuming a thread handle corresponding to a process ID of the extracted target process.

8. A method of operating a malicious code deactivating apparatus in association with database in an external server for distinguishing malicious code, the method comprising:

extracting a target process from a terminal for which malicious code is determined;

postponing execution of the extracted target process;

transmitting at least one piece of data attribute information of the postponed target process to an external server;

analyzing a result of a malicious code determination inspection of the target process received from the external server; and controlling the postponed target process according to the result of the malicious code determination inspection of the target process, wherein the extracting of the target process comprises:

extracting a newly created or downloaded process;

comparing the newly created or downloaded process with processes in a first white list that is stored in storage which is received from the external server; and extracting the target process that is not found in the first white list, wherein the result of a malicious code inspection is derived by executing the extracted target process in the external server so as to determine whether the extracted target process is infected with a malicious code or not before executing on the terminal.

* * * * *